(12) United States Patent
Ji et al.

(10) Patent No.: US 11,846,576 B2
(45) Date of Patent: Dec. 19, 2023

(54) TISSUE STAINING COMPOSITION AND TISSUE STAINING METHOD USING SAME

(71) Applicant: SAMSUNG LIFE PUBLIC WELFARE FOUNDATION, Seoul (KR)

(72) Inventors: Woo Hyun Ji, Gyeonggi-do (KR); Seong Il Cho, Seoul (KR); Kwang Il Kim, Gyeonggi-do (KR)

(73) Assignee: SAMSUNG LIFE PUBLIC WELFARE FOUNDATION, Seoul (KR)

( * ) Notice: Subject to any disclaimer, the term of this patent is extended or adjusted under 35 U.S.C. 154(b) by 339 days.

(21) Appl. No.: 17/146,674

(22) Filed: Jan. 12, 2021

(65) Prior Publication Data
US 2021/0215579 A1    Jul. 15, 2021

(30) Foreign Application Priority Data

Jan. 13, 2020    (KR) .......................... 10-2020-0004087

(51) Int. Cl.
*G01N 1/30*    (2006.01)
(52) U.S. Cl.
CPC ......... *G01N 1/30* (2013.01); *G01N 2001/302* (2013.01)

(58) Field of Classification Search
CPC .......................... G01N 2001/302; G01N 1/30
See application file for complete search history.

(56) References Cited

FOREIGN PATENT DOCUMENTS

| CN | 106644656 A | * | 1/2017 | ............... G01N 1/30 |
|---|---|---|---|---|
| CN | 106644656 A | | 5/2017 | |
| WO | WO-2018/206521 A1 | | 11/2018 | |

OTHER PUBLICATIONS

Renshaw, S., The Immunoassay Handbook, 4th ed.; Elsevier Science; Chapter 4.2. p. 357-377. (Year: 2013).*
Notification of Reason for Refusal of Korean Patent Application No. 10-2020-0004087 dated May 21, 2021.

* cited by examiner

*Primary Examiner* — Michelle F. Paguio Frising
*Assistant Examiner* — Grant C Currens
(74) *Attorney, Agent, or Firm* — Harness, Dickey & Pierce, P.L.C.

(57) ABSTRACT

Disclosed are a tissue staining composition and a tissue staining method using the same, wherein existing staining using hematoxylin and eosin staining reagents can be shortened from two steps to one step to reduce the reagent consumption and shorten the staining time, thereby achieving fast diagnosis.

2 Claims, 16 Drawing Sheets

TISSUE STAINING COMPOSITION AND TISSUE STAINING METHOD USING SAME

CROSS REFERENCE TO RELATED APPLICATION

This application claims priority to Korean Patent Application No. 10-2020-0004087, filed on 13 Jan. 2020. The entire disclosure of the application identified in this paragraph is incorporated herein by reference.

FIELD

The present disclosure relates to a tissue staining composition and a tissue staining method using the same, wherein existing staining using hematoxylin and eosin staining reagents can be shortened from two steps to one step to reduce the reagent consumption and shorten the staining time, thereby achieving fast diagnosis.

BACKGROUND

Hematoxylin & Eosin staining is the histological technique that has been most commonly used for visualization of pathology in tissue specimens. Conventional Hematoxylin & Eosin staining employs a solution containing aluminum-based hematoxylin, eosin, a differentiation solution, and a bluing agent.

Hematoxylin, which is a natural dye generating positively charged molecules, binds, when complexed with aluminum ions, to deoxyribose nucleic acid to produce purple coloration on cellular nuclei. A differentiation solution is typically a weak-acid solution that sharpens the contrast of stained slides by removing excessive background staining from tissues and slides. A staining agent is a basic pH solution that produces, when applied to stained samples, vivid blue/purple coloration by changing the structure of bound hematoxylin. Eosin is a negatively charged dye that binds to positively charged proteins in cytoplasm and connective tissues to produce a pink/orange color in contrast with a blue/purple color of nuclei.

Such conventional staining using hematoxylin and eosin is a staining method that is most frequently used in staining of tissue sections (for example, frozen sections), and hematoxylin binds to DNA and RNA to make nuclei look blue, while eosin binds to proteins, of which cytoplasm is composed, to stain the proteins red. It is known that the reason why the nuclei are stained with hematoxylin to look blue is that hematoxylin does not bind directly to the nuclei but hematein as an oxidized form of hematoxylin is bound to the nuclear chromatin in the form of a complex with an aluminum salt or an iron salt as a mordant agent.

Hematoxylin & Eosin staining is most frequently performed in a "batch" form, which has a problem in that two steps need to be carried out. Especially in staining of frozen section testing, a hematoxylin stage needs to be carried out through two or more steps, causing time delay. Moreover, hematoxylin and eosin staining reagents, which are expensive expendable reagents, cause a lot of consumption of material cost.

SUMMARY

The present inventors have developed a composition, which enables existing staining using hematoxylin and eosin staining reagents to be shortened from two steps to one step to reduce the reagent consumption and shorten the staining time, thereby achieving fast diagnosis.

Accordingly, an aspect of the present disclosure is to provide a tissue staining composition.

Another aspect of the present disclosure is to provide a tissue staining method using the tissue staining composition.

DETAILED DESCRIPTION OF THE INVENTION

The present disclosure is directed to a tissue staining composition and a tissue staining method using the same, wherein existing staining using hematoxylin and eosin staining reagents can be shortened from two steps to one step to reduce the reagent consumption and shorten the staining time, thereby achieving fast diagnosis.

Hereinafter, the present disclosure will be described in more detail.

An embodiment of the present disclosure is directed to a tissue staining composition capable of performing both hematoxylin staining and eosin staining.

Hematoxylin is in the form of colorless or light-yellow crystals obtained from a member (*Haematoxylon compechianum* L.) of the leguminous plants from Central and South America, and has a molecular formula of $C_{16}H_4O_6$. Hematoxylin is soluble in water, alcohol, glycerin, or the like, and turns dark pink in an alkaline solution, such as ammonia or boron, and yellow in an acidic solution. Hematoxylin produces red pigment hematein $C_{16}H_{12}O_6$ when left in air, and such a change is fast in the presence of iron ions. Hematoxylin is used in tissue staining since it stains nuclei, chromosomes, mitochondria, and the like blue-violet, and hematoxylin is used as a suitable indicator for alkaloids, a reagent for copper and iron, and the like.

Eosin is the tetrabromofluorescein sodium salt, $C_{20}H_6O_5Na_2BR$ and a thick aqueous solution thereof exhibits a reddish brown color, while a thin aqueous solution thereof turns into a yellowish red color and emits a green fluorescence. Eosin is used as a lake pigment and has a low fastness. Eosin is generally used as a raw material for red ink, crayons, typewriter ribbons, and printing ink, and is also used as a colorant for special fuels or as a reagent for analysis.

In the present disclosure, the tissue staining composition may contain both hematoxylin and eosin.

In the present disclosure, the volume ratio of hematoxylin and eosin contained in the tissue staining composition may be 1-5:1, 2-5:1, or 3-5:1, for example, 5:1, 4:1, or 3:1.

In the present disclosure, the tissue staining composition may further contain ammonia water.

In the present disclosure, the concentration of ammonia water may be 0.1-1.0% (v/v), 0.1-0.9% (v/v), 0.1-0.8% (v/v), 0.1-0.7% (v/v), 0.1-0.6% (v/v), 0.1-0.5% (v/v), 0.1-0.4% (v/v), 0.2-1.0% (v/v), 0.2-0.9% (v/v), 0.2-0.8% (v/v), 0.2-0.7% (v/v), 0.2-0.6% (v/v), 0.2-0.5% (v/v), 0.2-0.4% (v/v), 0.3-1.0% (v/v), 0.3-0.9% (v/v), 0.3-0.8% (v/v), 0.3-0.7% (v/v), 0.3-0.6% (v/v), 0.3-0.5% (v/v), or 0.3-0.4% (v/v), for example 0.3% (v/v), but is not limited thereto.

In the present disclosure, the content of ammonia water contained in the tissue staining composition may be 0.01-0.05 mL, 0.02-0.05 mL, or 0.03-0.05 mL, for example, 0.04 mL per 40.0 mL of the staining composition excluding ammonia water.

Another embodiment of the present disclosure is directed to a tissue staining method capable of performing both hematoxylin staining and eosin staining, the method including:

a tissue fixing step of fixing a sample with alcohol;

a first washing step of washing the sample with water;

a double staining step of staining the sample with a staining composition;

a second washing step of washing the sample with water;

a dehydrating step of dehydrating the sample with alcohol;

a clearing step of clearing the sample with xylene; and an encapsulating step of encapsulating the sample that has been stained.

Hematoxylin & Eosin staining is one of the most common double staining methods for tissue sections, and is used as an indispensable fundamental staining method in pathomorphological observation. In the stained specimens, the staining between cellular nuclei and cytoplasm is well distinguishable, wherein the nuclei are stained blue violet and the cytoplasm is stained rose pink, and fibers and cellular matrix are stained rose pink. Hematoxylin & Eosin staining causes no discoloration and can achieve permanent color preservation compared with other staining methods, so that pathological tissue specimens are first subjected to Hematoxylin-Eosin staining to identify tissue lesions, and if necessary, special staining is employed together.

Existing Hematoxylin & Eosin staining is performed in a batch form, which has a problem in that two steps need to be carried out. Especially in staining of frozen section testing, a hematoxylin stage needs to be performed through two or more steps, causing time delay.

The tissue staining method using the tissue staining composition in the present disclosure enables existing staining using hematoxylin and eosin staining reagents to be shortened from two steps to one step to reduce the reagent consumption and shorten the staining time, thereby achieving fast diagnosis.

In the present disclosure, descriptions of the staining composition used in the tissue staining method are the same as above.

In the present disclosure, the alcohol in the tissue fixing step may be ethanol, but is not limited thereto.

In the present disclosure, the first washing step may be performed at 20-25° C., but is not limited thereto.

In the present disclosure, the first washing step may be performed for 10-15 seconds, but is not limited thereto.

In the present disclosure, the double staining step may be performed at 20-25° C., but is not limited thereto.

In the present disclosure, the double staining step may be performed for 15-20 seconds, but is not limited thereto.

In the present disclosure, the double staining step may be performed using all types of stainers for frozen sections, for example, a semi-automatic stainer, but is not limited thereto.

In the present disclosure, the second washing step may be performed at 20-25° C., but is not limited thereto.

In the present disclosure, the second washing step may be performed for 10 seconds, but is not limited thereto.

In the present disclosure, the alcohol in the dehydrating step may be ethanol, but is not limited thereto.

As set forth above, the present disclosure is directed to a tissue staining composition and a tissue staining method using the same, wherein existing staining using hematoxylin and eosin staining reagents can be shortened from two steps to one step to reduce the reagent consumption and shorten the staining time, thereby achieving fast diagnosis.

BRIEF DESCRIPTION OF THE DRAWINGS

The above and other aspects, features and advantages of the present disclosure will be more apparent from the following detailed description taken in conjunction with the accompanying drawings.

DETAILED DESCRIPTION

Hereinafter, the present disclosure will be described in more detail by the following examples. However, these examples are used for illustration only, and the scope of the present disclosure is not limited by these examples.

EXAMPLE

Preparation Example 1: Preparation of Staining Compositions

Each reagent for staining compositions was purchased from Sigma company and used. As shown in Table 1 below, staining compositions were prepared by mixing hematoxylin and eosin.

TABLE 1

|           | Hematoxylin | Eosin | Total | Ratio |
|-----------|-------------|-------|-------|-------|
| Example 1 | 25 mL       | 25 mL | 50 mL | 1:1   |
| Example 2 | 40 mL       | 20 mL | 60 mL | 2:1   |
| Example 3 | 30 mL       | 10 mL | 40 mL | 3:1   |
| Example 4 | 28 mL       | 14 mL | 42 mL | 3:1.5 |
| Example 5 | 32 mL       | 8 mL  | 40 mL | 4:1   |
| Example 6 | 32 mL       | 12 mL | 42 mL | 4:1.5 |
| Example 7 | 35 mL       | 7 mL  | 42 mL | 5:1   |

Preparation Example 2: Preparation of Staining Compositions with Ammonia Water Added Staining compositions with ammonia water added were prepared by adding 0.02 mL or 0.04 mL of 0.3% (v/v) ammonia water per 40.0 mL of each of the staining compositions prepared in Preparation Example 1.

Figure 1:
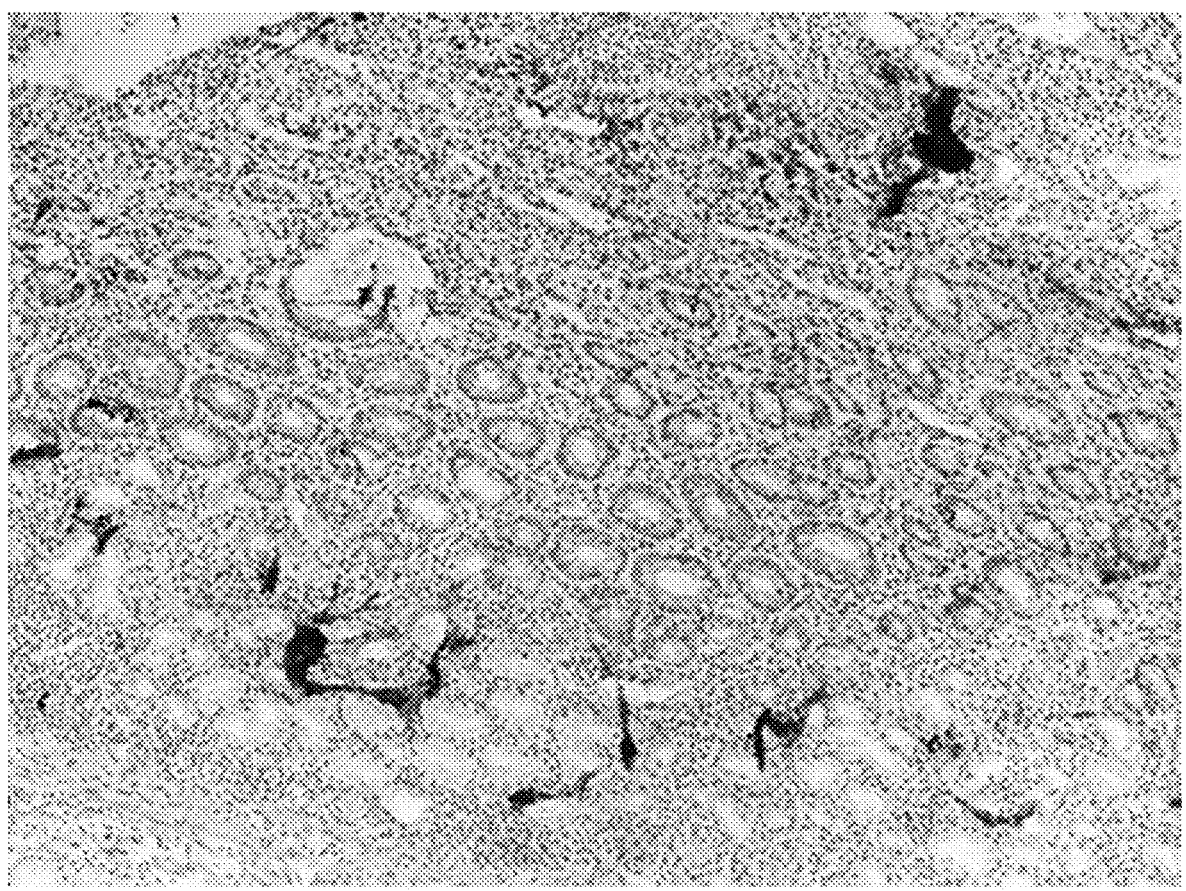
FIG. 1 is an image showing observation results of kidney tissue undergoing staining with hematoxylin and eosin at a ratio of 1:1 for 10 seconds according to an example of the present disclosure.
Figure 2:
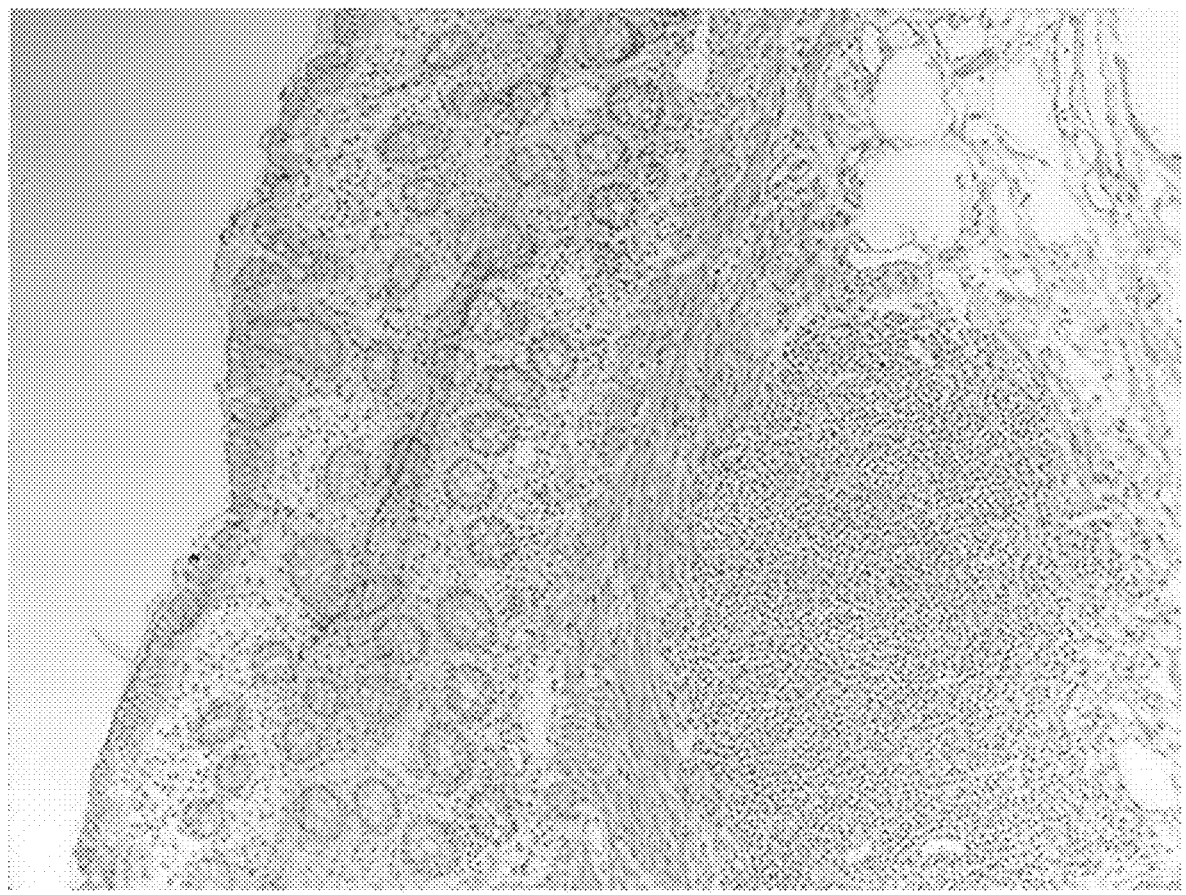
FIG. 2 is an image showing observation results of stomach tissue undergoing staining with hematoxylin and eosin at a ratio of 2:1 for 10 seconds according to an example of the present disclosure.
Figure 3:
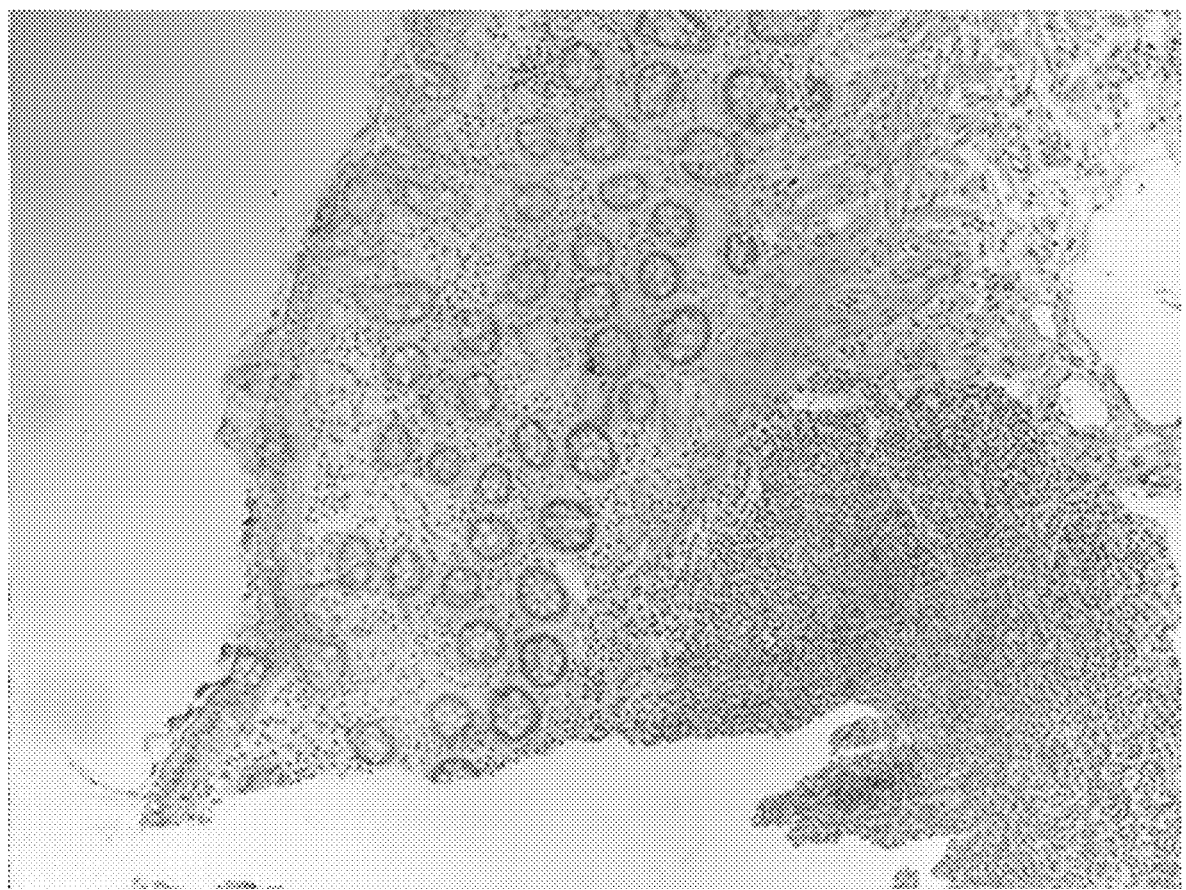
FIG. 3 is an image showing observation results of stomach tissue undergoing staining with hematoxylin and eosin at a ratio of 1:1 for 20 seconds according to an example of the present disclosure.
Figure 4:
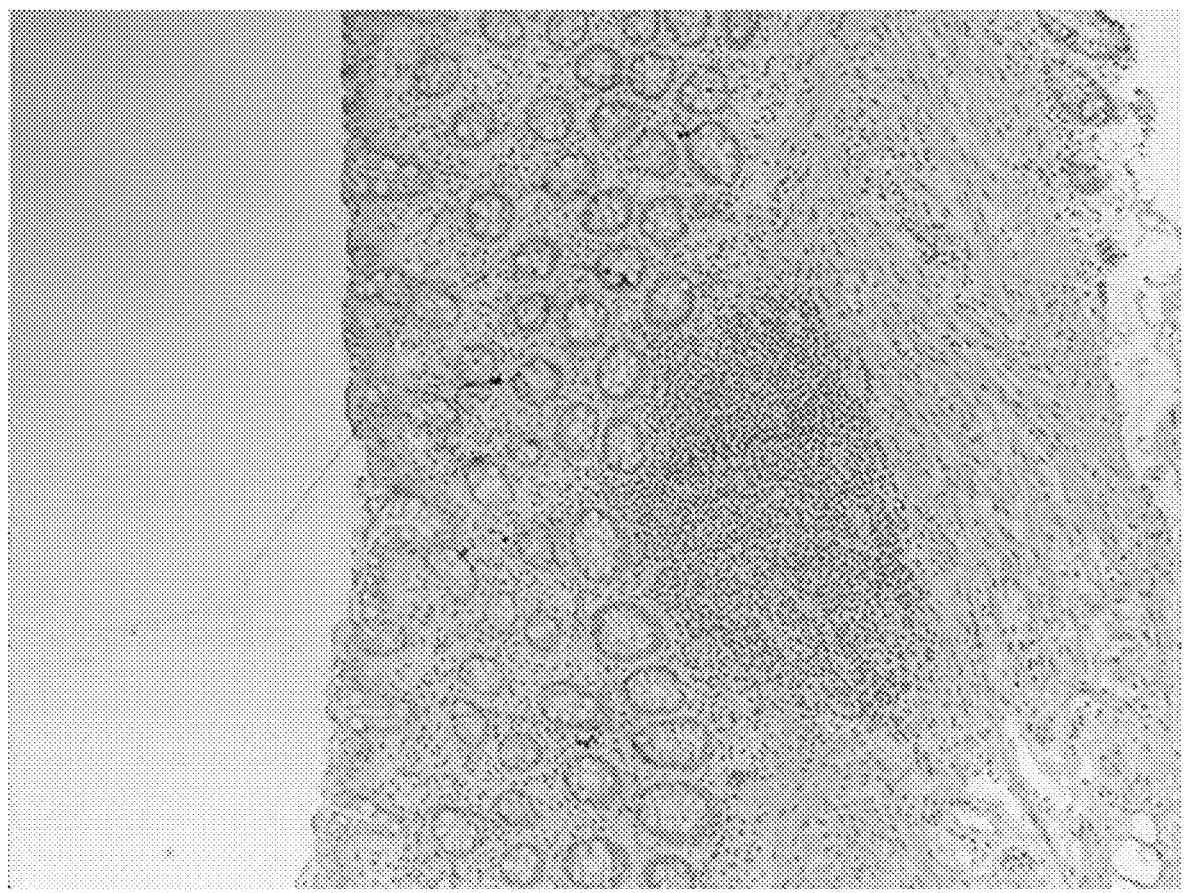
FIG. 4 is an image showing observation results of stomach tissue undergoing staining with hematoxylin and eosin at a ratio of 3:1 for 10 seconds according to an example of the present disclosure.
Figure 5:
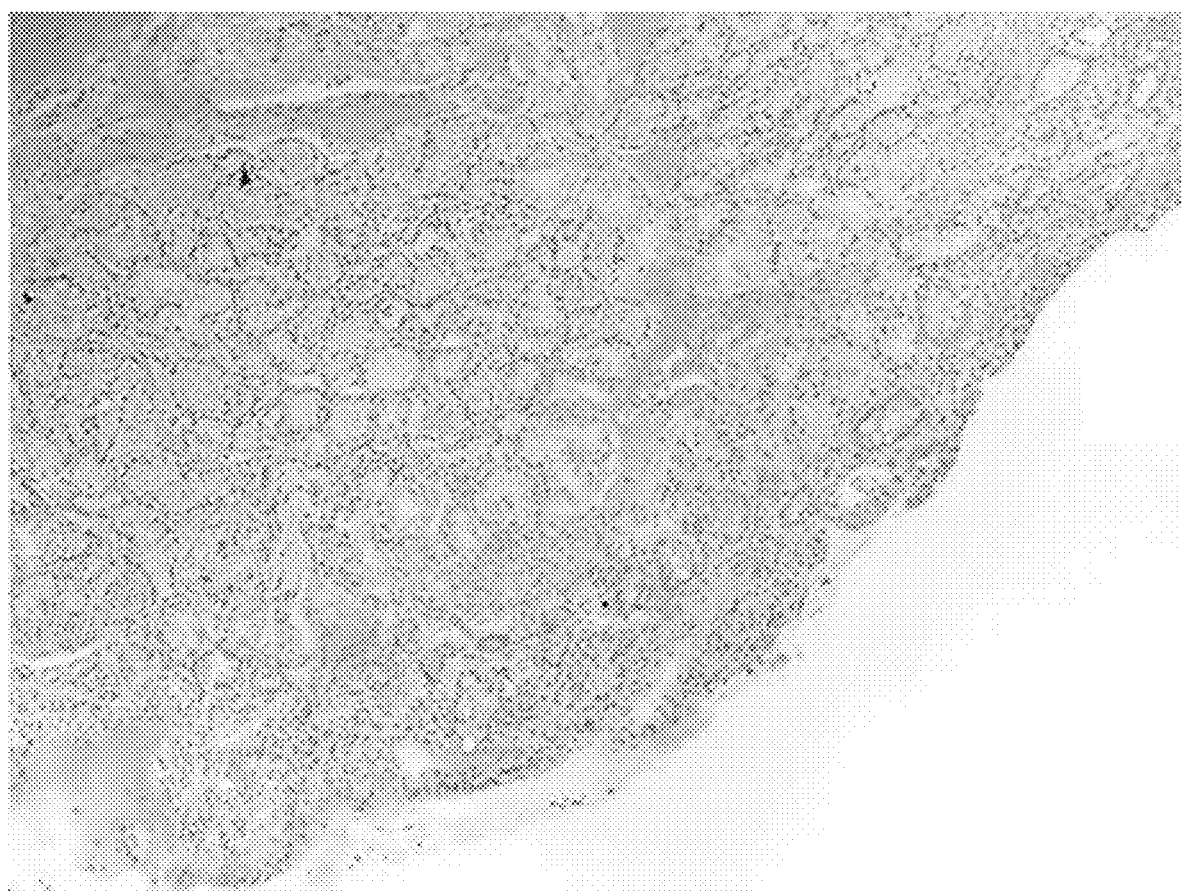
FIG. 5 is an image showing observation results of stomach tissue undergoing staining with hematoxylin and eosin at a ratio of 3:1.5 for 10 seconds according to an example of the present disclosure.
Figure 6:
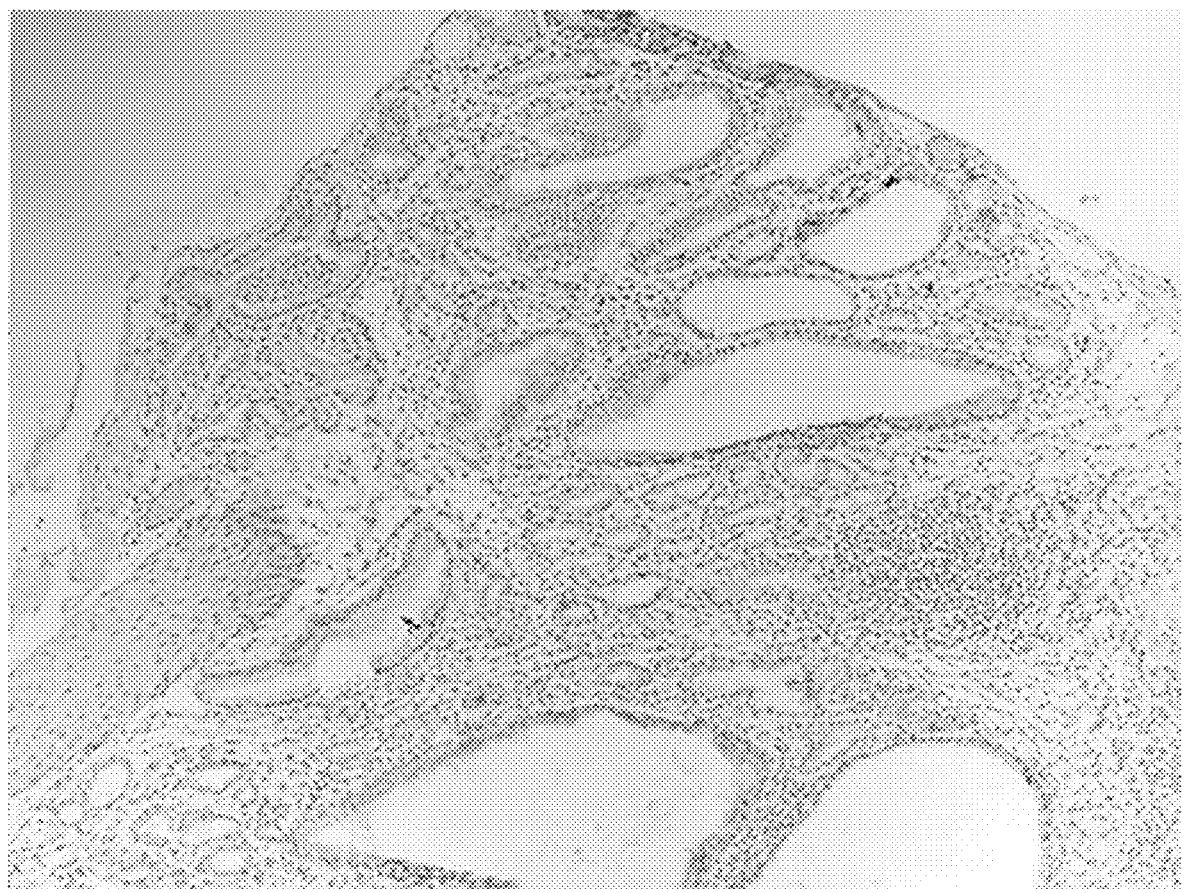
FIG. 6 is an image showing observation results of stomach tissue undergoing staining with hematoxylin and eosin at a ratio of 4:1.5 for 10 seconds according to an example of the present disclosure.
Figure 7:
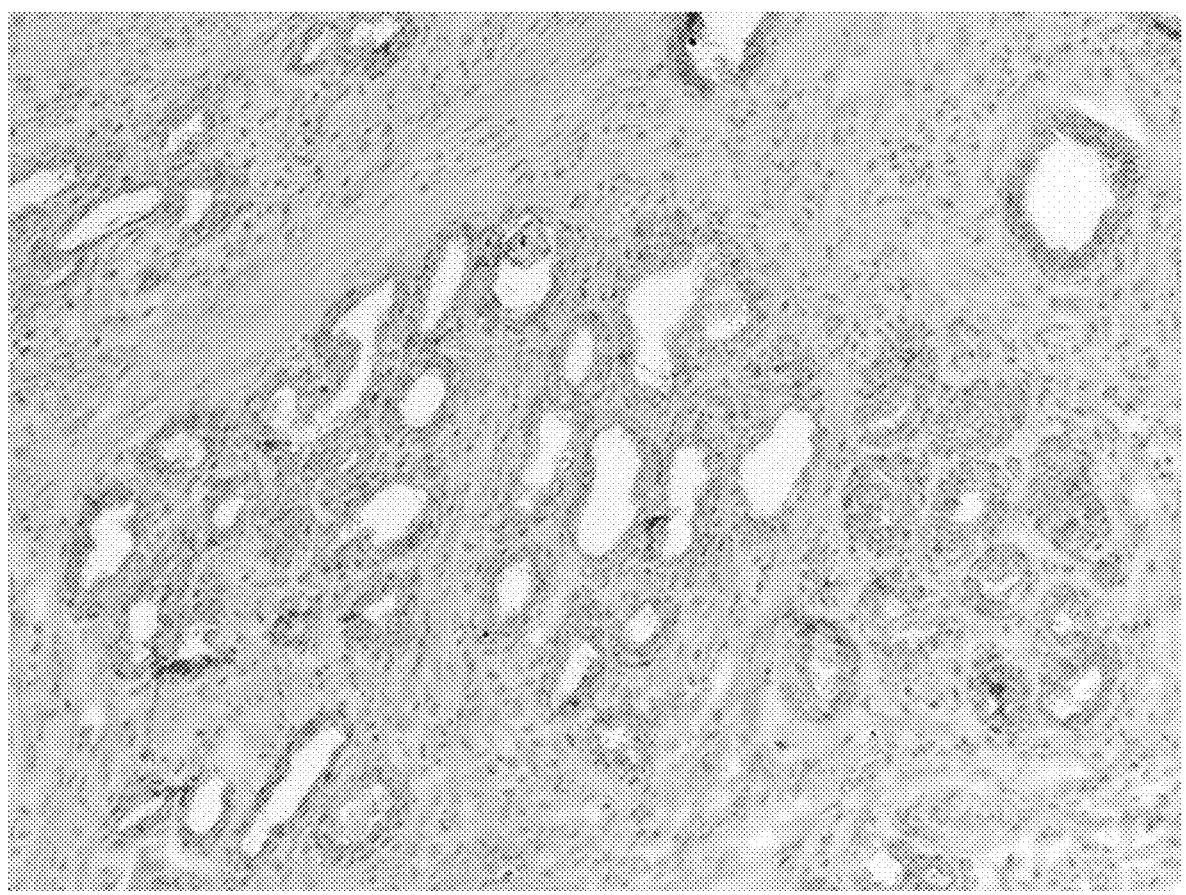
FIG. 7 is an image showing observation results of stomach tissue undergoing staining with hematoxylin and eosin at a ratio of 4:1.5 for 20 seconds according to an example of the present disclosure.
Figure 8:
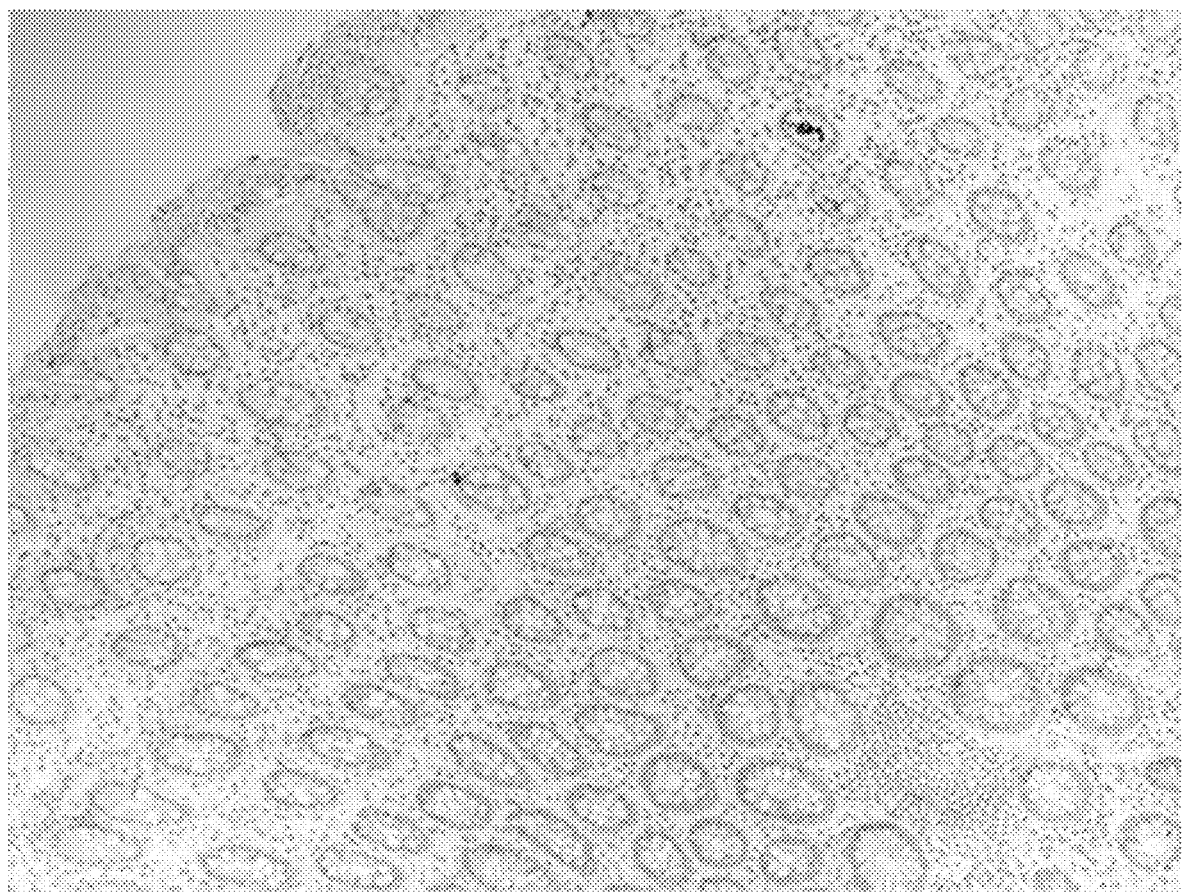
FIG. 8 is an image showing observation results of stomach tissue undergoing staining with hematoxylin and eosin at a ratio of 5:1 for 10 seconds according to an example of the present disclosure.
Figure 9:
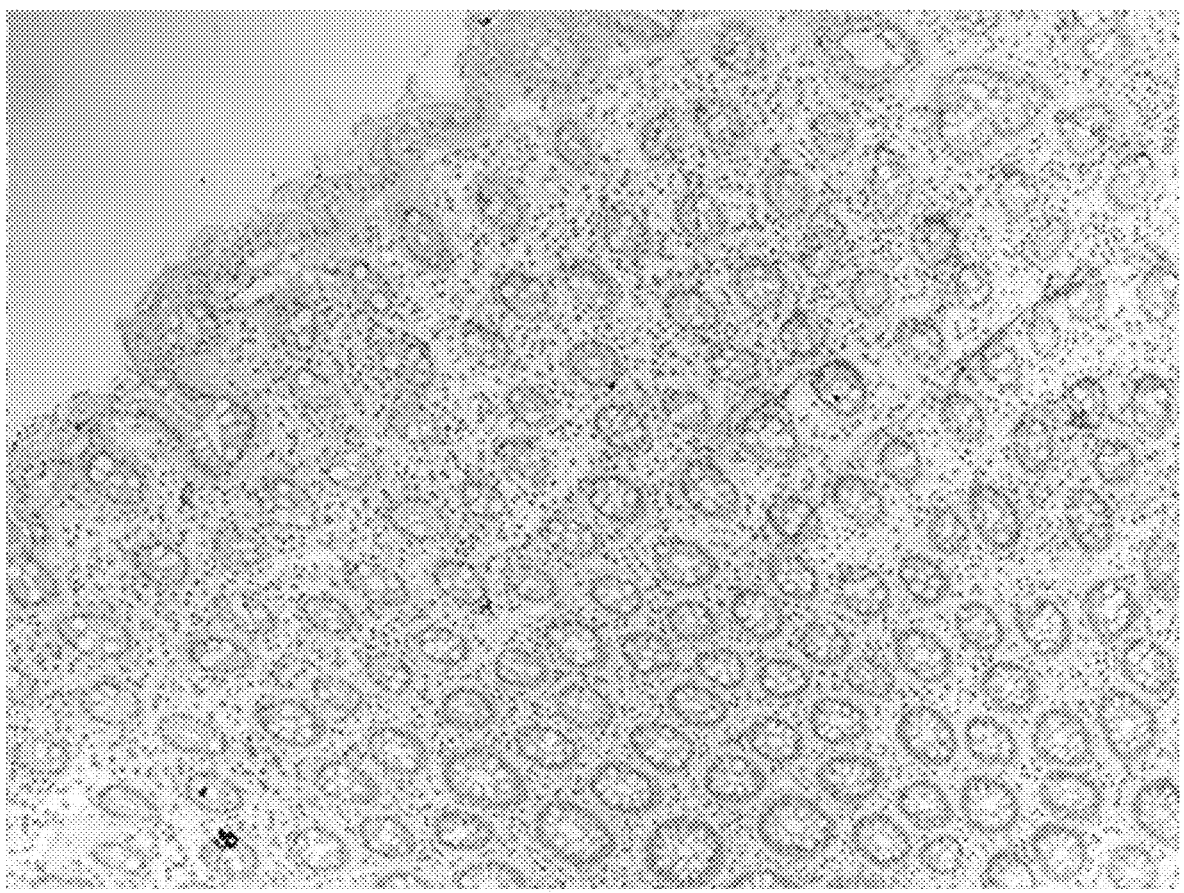
FIG. 9 is an image showing observation results of stomach tissue undergoing staining with hematoxylin and eosin at a ratio of 5:1 for 20 seconds according to an example of the present disclosure.
Figure 10:
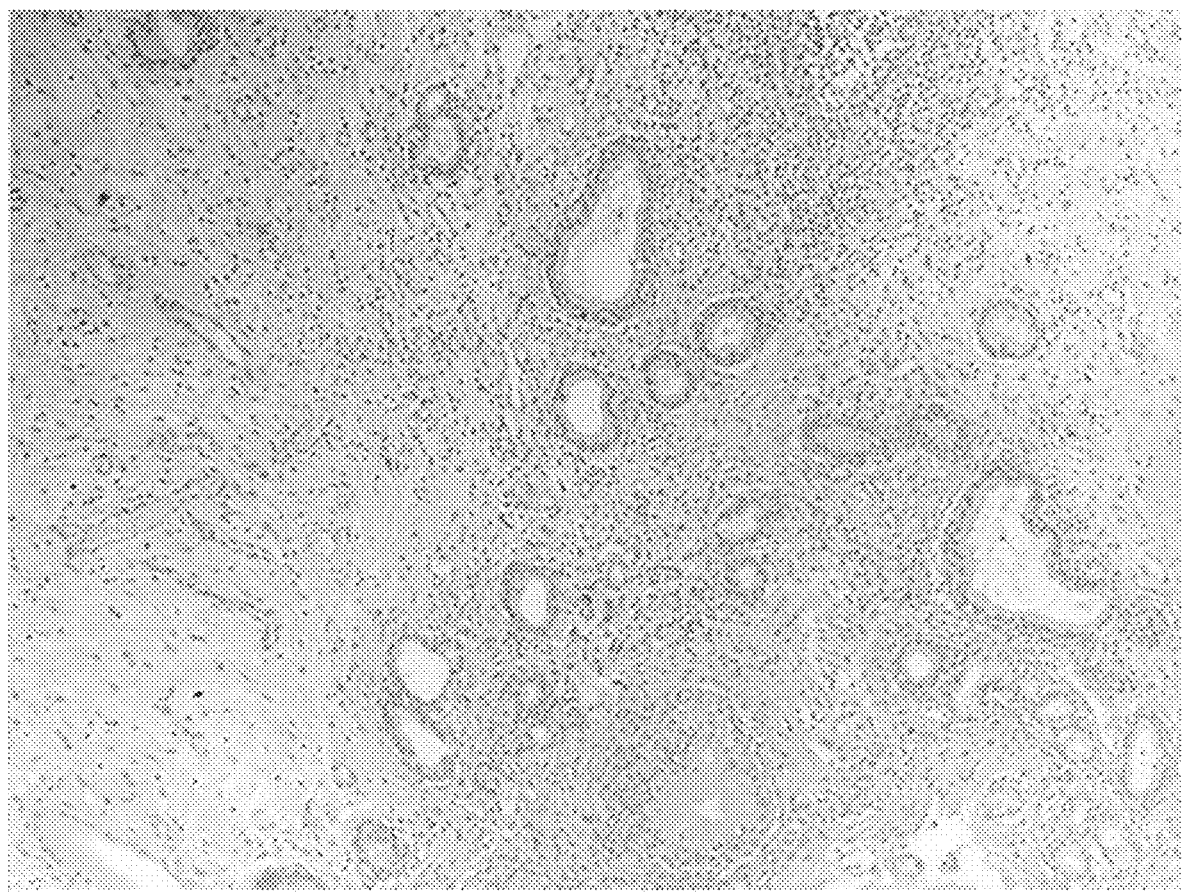
FIG. 10 is an image showing observation results of lung lymph node tissue undergoing staining with hematoxylin and eosin at a ratio of 4:1 for 10 seconds according to an example of the present disclosure.

Experimental Example 1: Verification of Staining Degree Depending on Mixing Ratio and Staining Time After frozen section samples extracted from patients were fixed with alcohol, the staining compositions of Preparation Example 1 were added, and reacted through a semi-automatic stainer at 20-25° C. Then, the samples were washed with water at 20-25° C. for 10 seconds. Then, the samples were completely dehydrated with 100% (v/v) ethanol, and then cleared with xylene and encapsulated. Then, the cells were observed by an optical microscope, and the results are shown in FIGS. 1 to 10 and Table 2.

Unreadable: Staining degree was very poor and results were unreadable.

Not good: Staining degree was not good and results were problematic to read.

Fair: Staining degree was not excellent but results were readable

Readable: Staining degree was excellent and results were readable.

Good: Staining degree was very excellent and results were easy to read.

TABLE 2

|           | 10 seconds, once | 20 seconds, once | 10 seconds, twice |
|-----------|------------------|------------------|-------------------|
| Example 1 | Unreadable       | —                | —                 |
| Example 2 | Unreadable       | Unreadable       | —                 |
| Example 3 | Not good         | Not good         | Not good          |
| Example 4 | Not good         | Not good         | Not good          |
| Example 5 | Fair             | Readable         | Readable          |
| Example 6 | Not good         | Fair             | Fair              |
| Example 7 | Not good         | Fair             | Fair              |

As can be confirmed in FIGS. 1 to 10 and Table 2, the staining composition having a mixing ratio of 4:1 showed an optimal staining power and obtained results at a level similar to the quality of existing staining.

Figure 11:
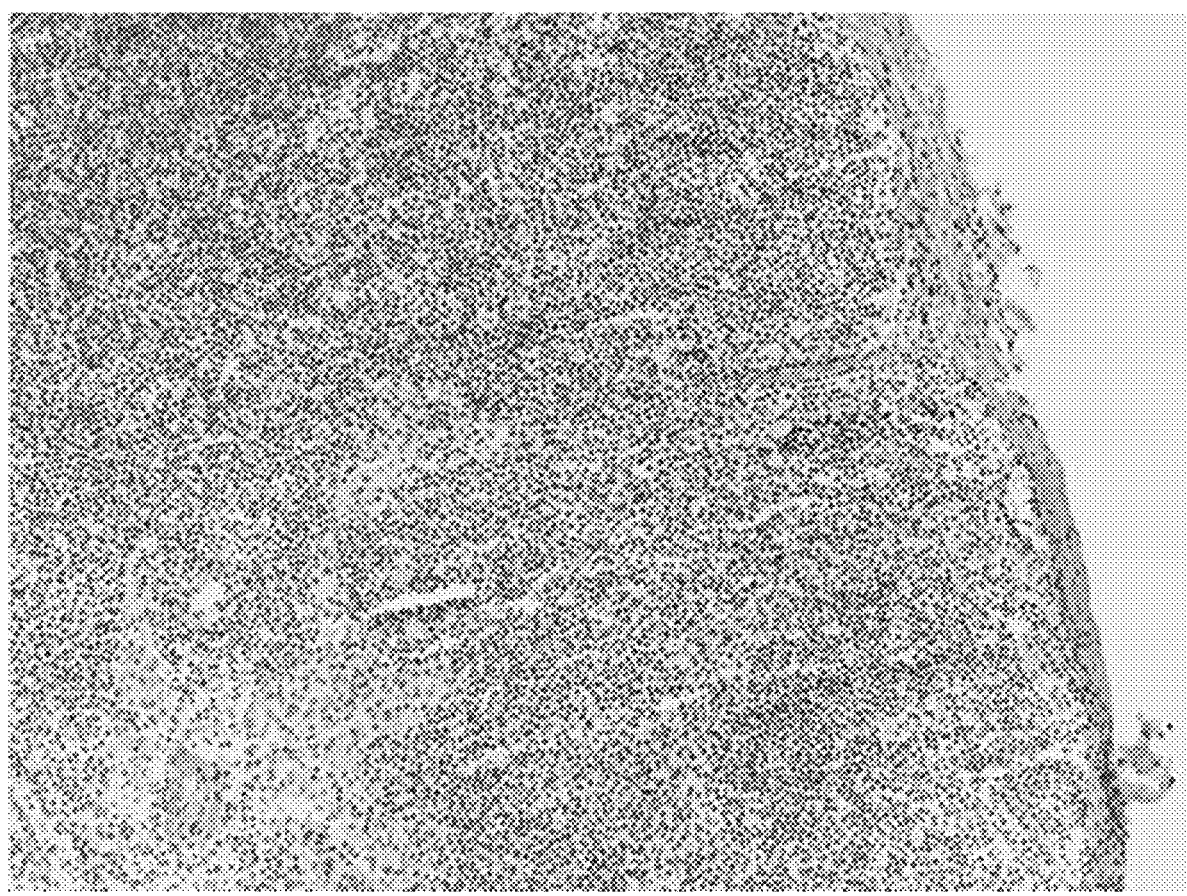
FIG. 11 is an image showing observation results of breast lymph node tissue undergoing staining with hematoxylin and eosin at a ratio of 4:1 for 20 seconds according to an example of the present disclosure.
Figure 12:
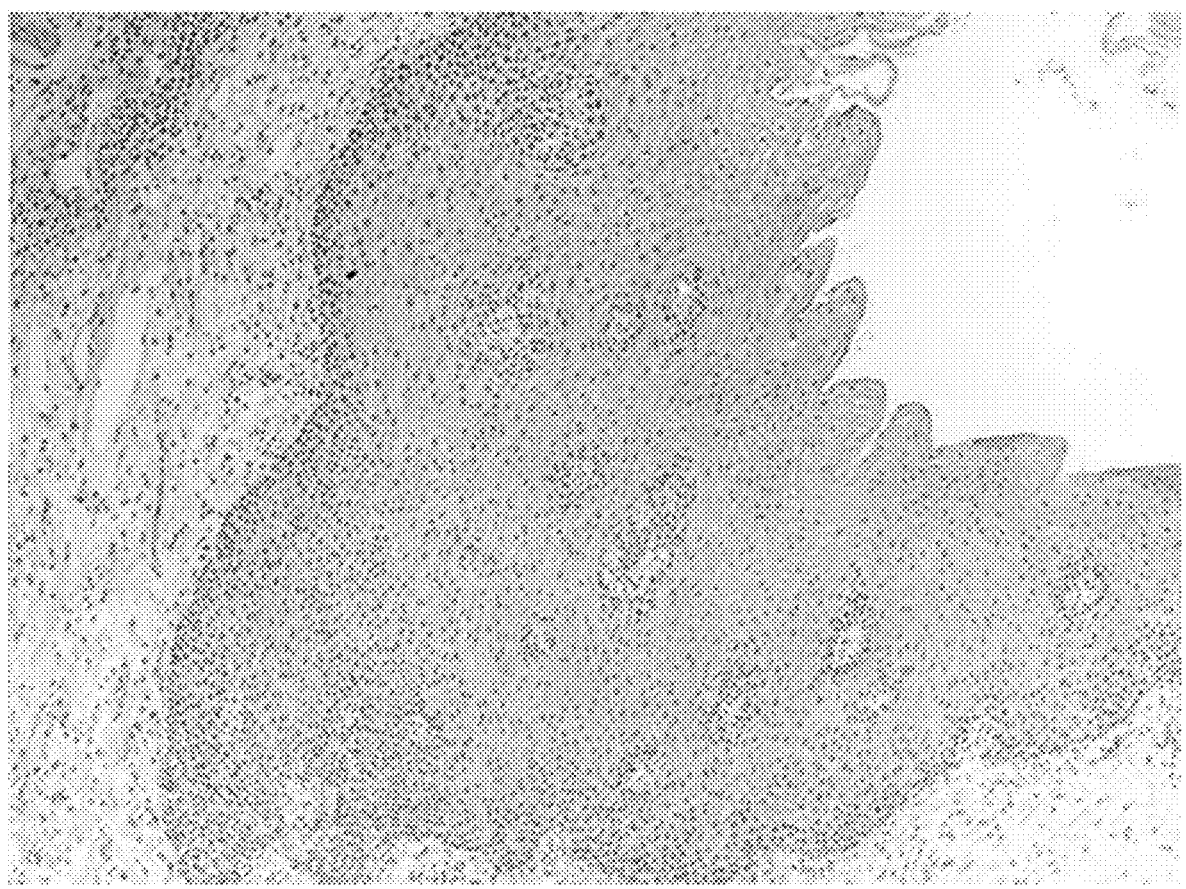
FIG. 12 is an image showing observation results of breast lymph node tissue undergoing staining with hematoxylin and eosin at a ratio of 4:1 for 20 seconds according to an example of the present disclosure.
Figure 13:
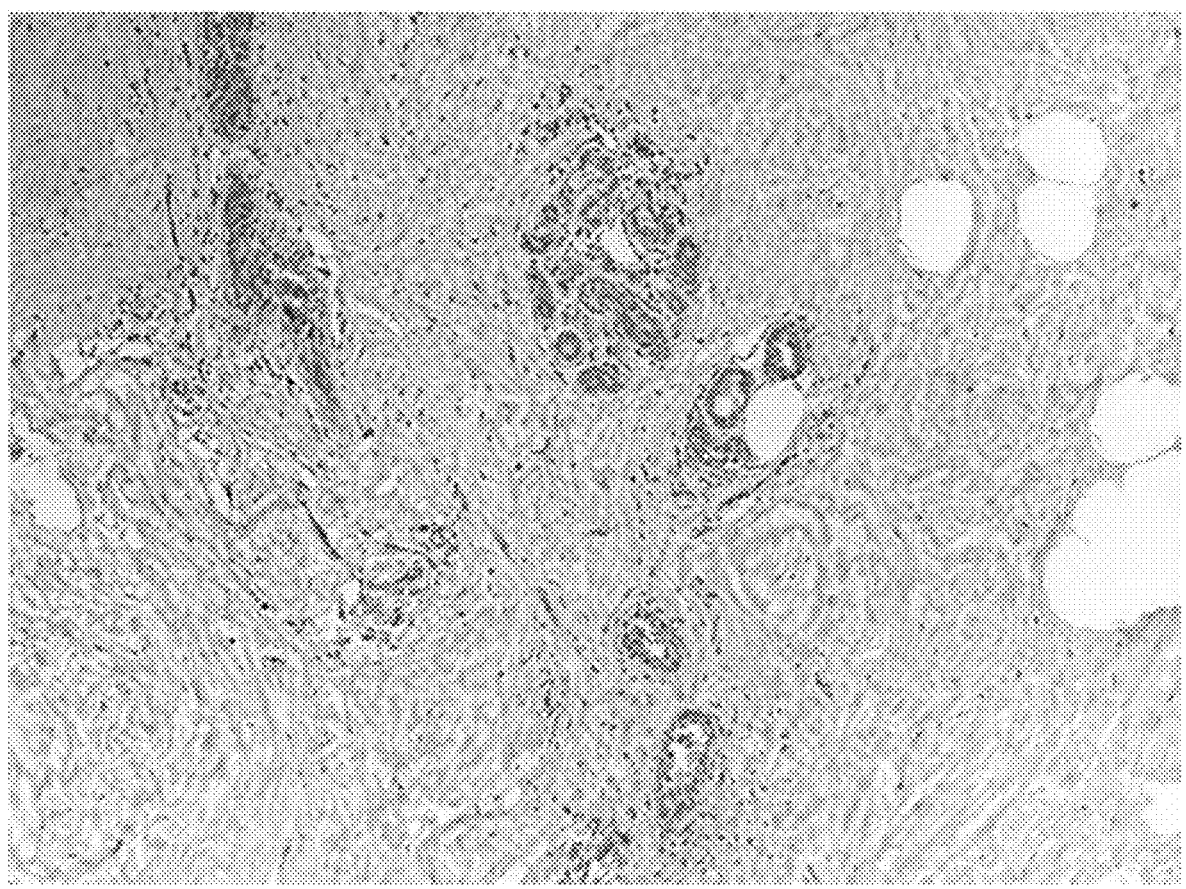
FIG. 13 is an image showing observation results of breast lymph node tissue undergoing staining with hematoxylin and eosin at a ratio of 4:1 for 20 seconds according to an example of the present disclosure.
Figure 14:
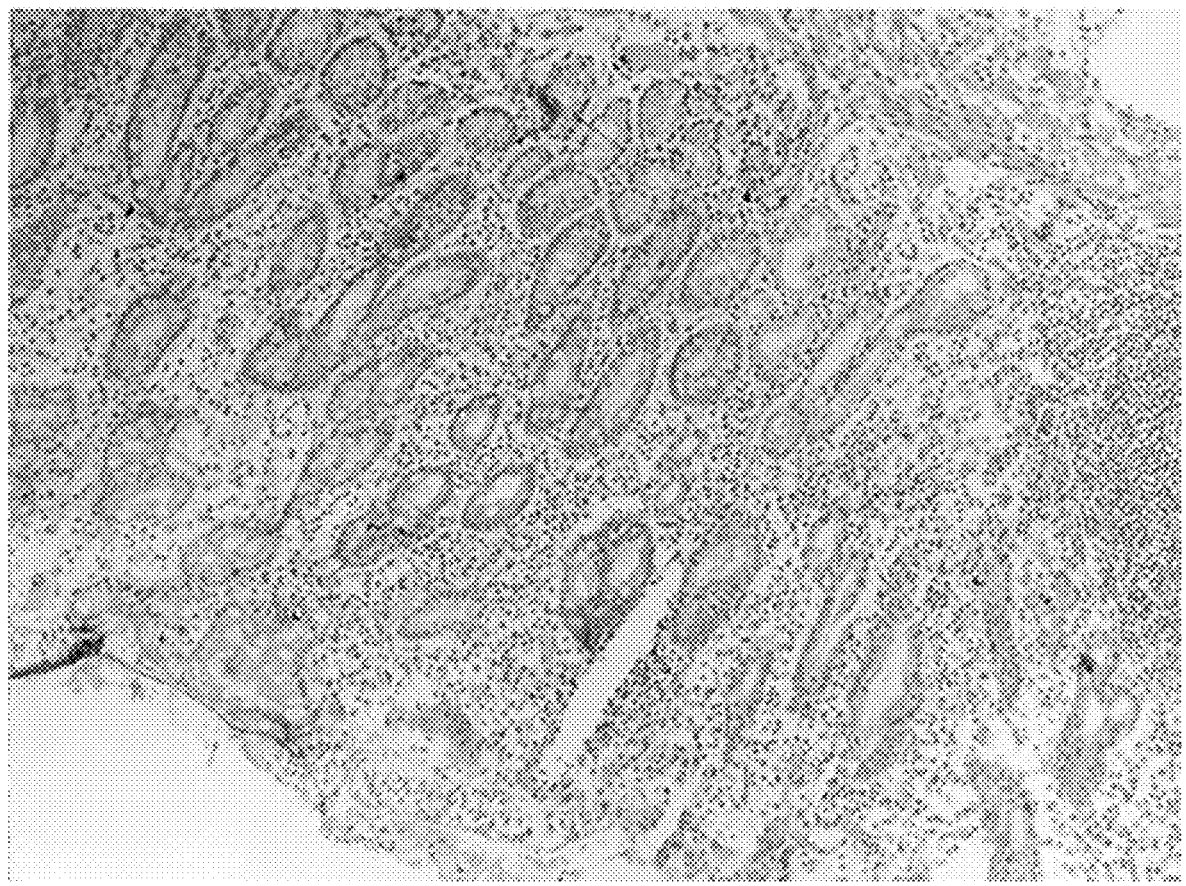
FIG. 14 is an image showing observation results of stomach tissue undergoing staining with hematoxylin and eosin at a ratio of 4:1 for 20 seconds according to an example of the present disclosure.
Figure 15:
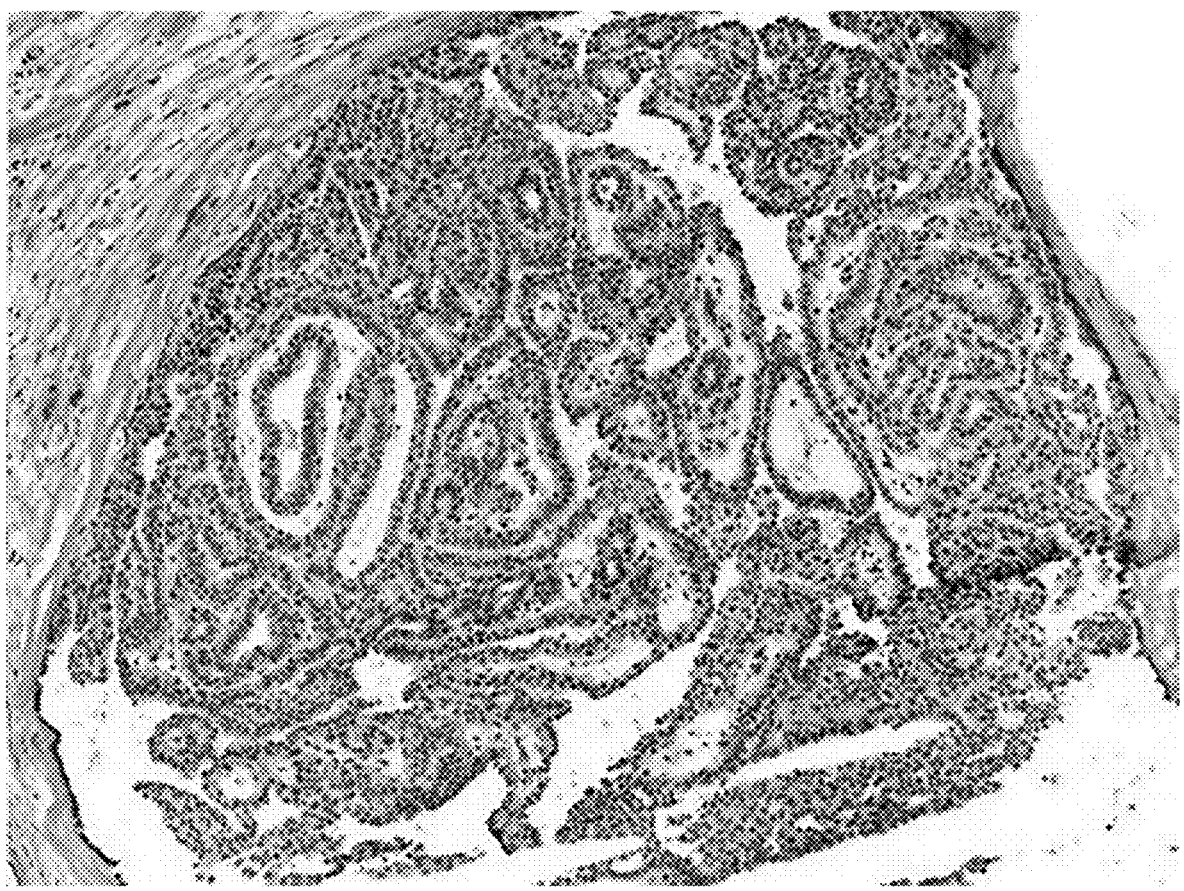
FIG. 15 is an image showing observation results of breast tissue undergoing staining with hematoxylin and eosin at a ratio of 4:1 for 20 seconds according to an example of the present disclosure.
Figure 16:
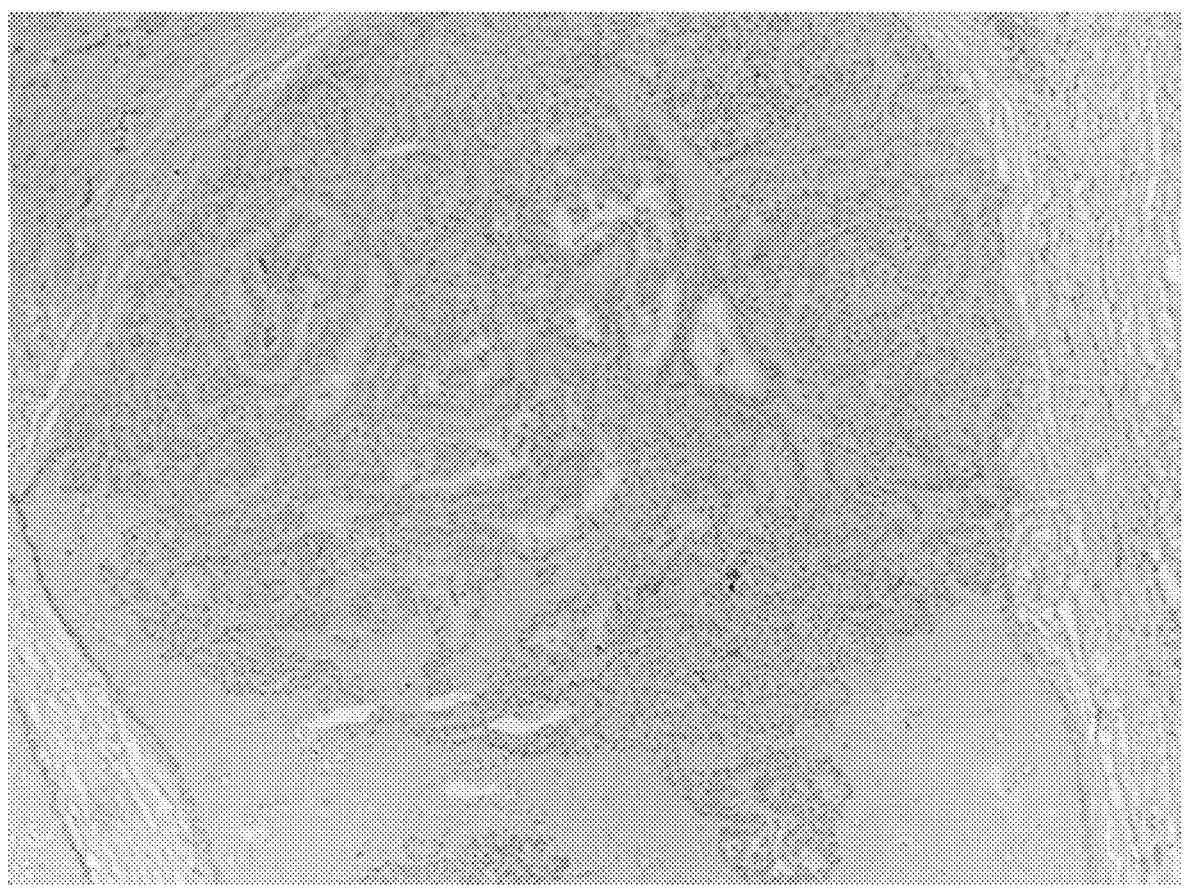
FIG. 16 is an image showing observation results of breast tissue undergoing staining with hematoxylin and eosin at a ratio of 4:1 for 20 seconds according to an example of the present disclosure.

Experimental Example 2: Verification of Staining Degree Depending on Addition of Ammonia Water After frozen section samples extracted from patients were fixed with alcohol, the staining compositions of Preparation Example 2 were added, and reacted through a semi-automatic stainer at 20-25° C. Then, the samples were washed with water at 20-25° C. for 10 seconds. Then, the samples were completely dehydrated with 100% (v/v) ethanol, and then cleared with xylene and encapsulated. Then, the cells were observed by an optical microscope, and the results are shown in FIGS. 11 to 15 and Table 3.

TABLE 3

|           | 1 Drop (0.02 mL) | 2 Drops (0.04 mL) |
|-----------|------------------|-------------------|
| Example 4 | Not good         |                   |
| Example 5 | Readable         | Good              |
| Example 6 | Fair             | Fair              |

As can be confirmed in FIGS. 11 to 15 and Table 3, the final staining composition with 2 drops of 0.3% (v/v) ammonia water showed excellent staining power compared with the existing composition having a ratio of 4:1, and has an effect of partially blocking precipitate formation over time, which has been a problem.

What is claimed is:

1. A staining composition capable of performing both hematoxylin staining and eosin staining, the staining composition comprising hematoxylin, eosin, and ammonia water,
   wherein the concentration of ammonia water is 0.3% (v/v),
   wherein the content of ammonia water is 0.04 mL per 40.0 mL of the staining composition excluding ammonia water, and
   wherein the volume ratio of hematoxylin and eosin contained in the staining composition is 4:1.

2. A tissue staining method for performing both hematoxylin staining and eosin staining, the method comprising the following steps in sequential order:
   (i) a tissue fixing step of fixing a sample with alcohol;
   (ii) a first washing step of washing the sample with water;
   (iii) a double staining step of staining the sample with a staining composition, the staining composition containing hematoxylin, eosin, and ammonia water and being capable of performing both hematoxylin staining and eosin staining;
   (iv) a second washing step of washing the sample with water;
   (v) a dehydrating step of dehydrating the sample with alcohol;
   (vi) a clearing step of clearing the sample with xylene;
   (vii) an encapsulating step of encapsulating the sample that has been stained,
   wherein the concentration of ammonia water is 0.3% (v/v),
   wherein the content of ammonia water is 0.04 mL per 40.0 mL of the staining composition excluding ammonia water, and wherein the volume ratio of hematoxylin and eosin contained in the staining composition is 4:1.

* * * * *